US008768904B2

(12) United States Patent
Baranczyk et al.

(10) Patent No.: US 8,768,904 B2
(45) Date of Patent: Jul. 1, 2014

(54) INTELLIGENT OPEN QUERY CURSOR MANAGEMENT

(75) Inventors: Shawn Joseph Baranczyk, Rochester, MN (US); Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 11/622,532

(22) Filed: Jan. 12, 2007

(65) Prior Publication Data
US 2008/0172369 A1   Jul. 17, 2008

(51) Int. Cl.
*G06F 7/00* (2006.01)
*G06F 17/00* (2006.01)
*G06F 17/30* (2006.01)
*G06F 15/16* (2006.01)

(52) U.S. Cl.
USPC .......................................... 707/704; 707/781

(58) Field of Classification Search
USPC ................................. 707/704, 781
See application file for complete search history.

(56) References Cited

U.S. PATENT DOCUMENTS

| 5,210,686 | A  | * | 5/1993  | Jernigan ......................... 705/29 |
| 5,220,665 | A  | * | 6/1993  | Coyle et al. .................. 718/101 |
| 5,835,904 | A  | * | 11/1998 | Vicik et al. ....................... 707/1 |
| 6,044,216 | A  | * | 3/2000  | Bhargava et al. ............. 717/114 |
| 7,133,861 | B2 | * | 11/2006 | Day et al. .......................... 707/2 |
| 2005/0125409 | A1 | * | 6/2005 | Day et al. ....................... 707/10 |
| 2005/0131878 | A1 | * | 6/2005 | Chen et al. ...................... 707/3 |
| 2006/0095406 | A1 |   | 5/2006 | Bestgen et al. |

* cited by examiner

*Primary Examiner* — Greta Robinson
*Assistant Examiner* — Brian E. Weinrich
(74) *Attorney, Agent, or Firm* — Matthew J. Bussan (57) ABSTRACT

An enhanced mechanism for intelligently managing an open query cursor built from a query access plan (AP) by a query optimizer of a database management system (DBMS). In an embodiment, a cursor management system (CMS) detects whether an open query cursor was previously requested for use within another job. If the open query cursor was previously requested, the CMS intelligently manages the query cursor for subsequent use within a different job. For example, the open query cursor may be recycled for subsequent use within the different job. Hence, system resources are not wasted in building and destroying the same cursors for multiple jobs. Alternatively, the query cursor may be pre-built before the cursor is requested for subsequent use within the different job. The CMS may also obtain, release and re-obtain locks for cursors being managed. Alternatively, the job that uses the cursor may obtain the lock.

3 Claims, 4 Drawing Sheets

INTELLIGENT OPEN QUERY CURSOR MANAGEMENT

BACKGROUND OF THE INVENTION

1. Field of Invention

The present invention relates in general to the digital data processing field. More particularly, the present invention relates to a mechanism for intelligently managing an open query cursor built from a query access plan (AP) by a query optimizer of a database management system (DBMS).

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

The overall value or worth of a computer system depends largely upon how well the computer system stores, manipulates, and analyzes data. One mechanism for managing data is called a database management system (DBMS).

At a most basic level, a database stores data as a series of logical tables. Each table is made up of rows and columns. Each table has a unique name within the database and each column has a unique name within the particular table. Different statements called queries allow the user or an application program to obtain data from the database. As one might imagine, queries range from being very simple to very complex.

When a database receives a query, the database interprets the query and determines what internal steps are necessary to satisfy the query. These internal steps may include identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are typically referred to as an access plan (AP), although they are sometimes referred to as an execution plan.

The access plan is typically created by a software component that is often called a query optimizer. For a single given query, the current state of the art for database performance is as close to optimal as can be achieved. Further database performance gains can only be found in more intelligent reuse techniques among multiple queries.

One reuse technique relates to access plan reuse. Consequently, when a query optimizer creates an access plan for a given query, the access plan is often saved by the database management system in an access plan cache. The access plan may also be saved in an SQL (Structured Query Language) package or in a program object, e.g., the application program that requested the query. Then, when the user or program object repeats the query, the database can reutilize the saved access plan instead of undergoing the time-consuming process of recreating it.

Query access plan reuse is well known in the art. For example, U.S. Pat. No. 7,133,861 B2, entitled "QUERY ACCESS PLAN REUSE", issued on Nov. 7, 2006 to Day et al., and assigned to IBM Corporation, discloses a method, apparatus and system that determine when to rebuild a query access plan.

Another reuse technique relates to the reuse of an open query cursor, which, as explained below, is the query executable structure built from a query access plan. Open query cursor reuse is a very different technology than query access plan reuse.

Query cursors are associated with multirow queries. Query cursors also can be associated with single row queries. A multirow query is a query that returns more than one row and its execution is handled in two stages. First, the program starts the query, although no data is returned immediately. Then, the program requests the rows of data one at a time.

These operations are performed using a special data object called a "cursor". A cursor is an executable data structure that represents the state of a query, either single row or multirow, and is built from a query access plan. The following list shows the general sequence of program operations:

1. The program declares the cursor and its associated SELECT statement, which merely allocates storage to hold the cursor.

2. The program opens the cursor, which starts the execution of the associated SELECT statement and detects any errors in it.

3. The program fetches a row of data into host variables and processes it.

4. The program closes the cursor after the last row is fetched.

5. When the cursor is no longer needed, the program frees the cursor to deallocate the resources it uses.

These operations may, for example, be performed with SQL statements named DECLARE, OPEN, FETCH, CLOSE, and FREE. Thus, an open query cursor, which is sometimes referred to as an open data path (ODP), is the object built when a user or application program issues an SQL OPEN statement, and is the live object which returns rows when a user or application program issues an SQL FETCH statement. Although SQL is a common interface, other interfaces such as QUERY (IBM iSeries), DDL, XML, etc. may be used to perform the requisite operations.

In the current state of the art, a query cursor within a particular job/process/thread may be reused if that query is rerun within the same job/process/thread. However, there is currently no means to reuse a query cursor for a different job. Thus, system resources are wasted in building and destroying the same cursors for multiple jobs, as illustrated by the following two problem scenarios.

In a first illustrative problem scenario, one thousand users at a typical call center logon their computer system at 8:00 am. They all run an application with twenty-five common queries. Therefore, at 8:00 am, the computer system must perform "full opens" on twenty-five thousand queries (i.e., 1000×25 queries). At a CPU cost of about ½ second per a full open, a considerable CPU cost spike of 208 CPU minutes occurs at 8:00 am. A similar CPU cost spike may be felt at other times during the day, such as after lunch when all of the users again logon their computer system.

A second illustrative problem scenario occurs, for example, in the context of an online web retail application. Multiple users throughout the day run a handful of the same queries, such as lookup product X. Each of the users must pay a full open hit when they sign on, as the cursors are built, when the query is run, when the query is closed, and when the ODP is destroyed. No users benefit from the similar full opens of other users that occurred previously. Consequently, CPU time is wasted by building the same query cursor over and over for different users.

Therefore, a need exists for an enhanced mechanism for intelligent re-use of an open query cursor.

SUMMARY OF THE INVENTION

According to the preferred embodiments of the present invention, a cursor management system (CMS) provides intelligent open query cursor management. An open query cursor is built from a query access plan (AP) by a query optimizer of a database management system (DBMS). The CMS detects whether the open query cursor was previously requested for use within another job. If the open query cursor was previously requested, the CMS intelligently manages the query cursor for subsequent use within a different job. For example, the open query cursor may be recycled for subsequent use within the different job. Hence, system resources are not wasted in building and destroying the same cursors for multiple jobs. Alternatively, the query cursor may be pre-built before the cursor is requested for subsequent use within the different job.

According to another aspect of the preferred embodiments of the present invention, the CMS may also obtain, release and re-obtain locks for cursors being managed. Alternatively, the job that uses the cursor may obtain the lock.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1.0 Overview

In accordance with the preferred embodiments of the present invention, a cursor management system (CMS) provides intelligent open query cursor management. An open query cursor is built from a query access plan (AP) by a query optimizer of a database management system (DBMS). The CMS detects whether the open query cursor was previously requested for use within another job. If the open query cursor was previously requested, the CMS intelligently manages the query cursor for subsequent use within a different job. For example, the open query cursor may be recycled for subsequent use within the different job. Hence, system resources are not wasted in building and destroying the same cursors for multiple jobs. Alternatively, the query cursor may be pre-built before the cursor is requested for subsequent use within the different job.

In accordance with another aspect of the preferred embodiments of the present invention, the CMS may also obtain, release and re-obtain locks for cursors being managed. Alternatively, the job that uses the cursor may obtain the lock.

2.0 Detailed Description

Figure 1:
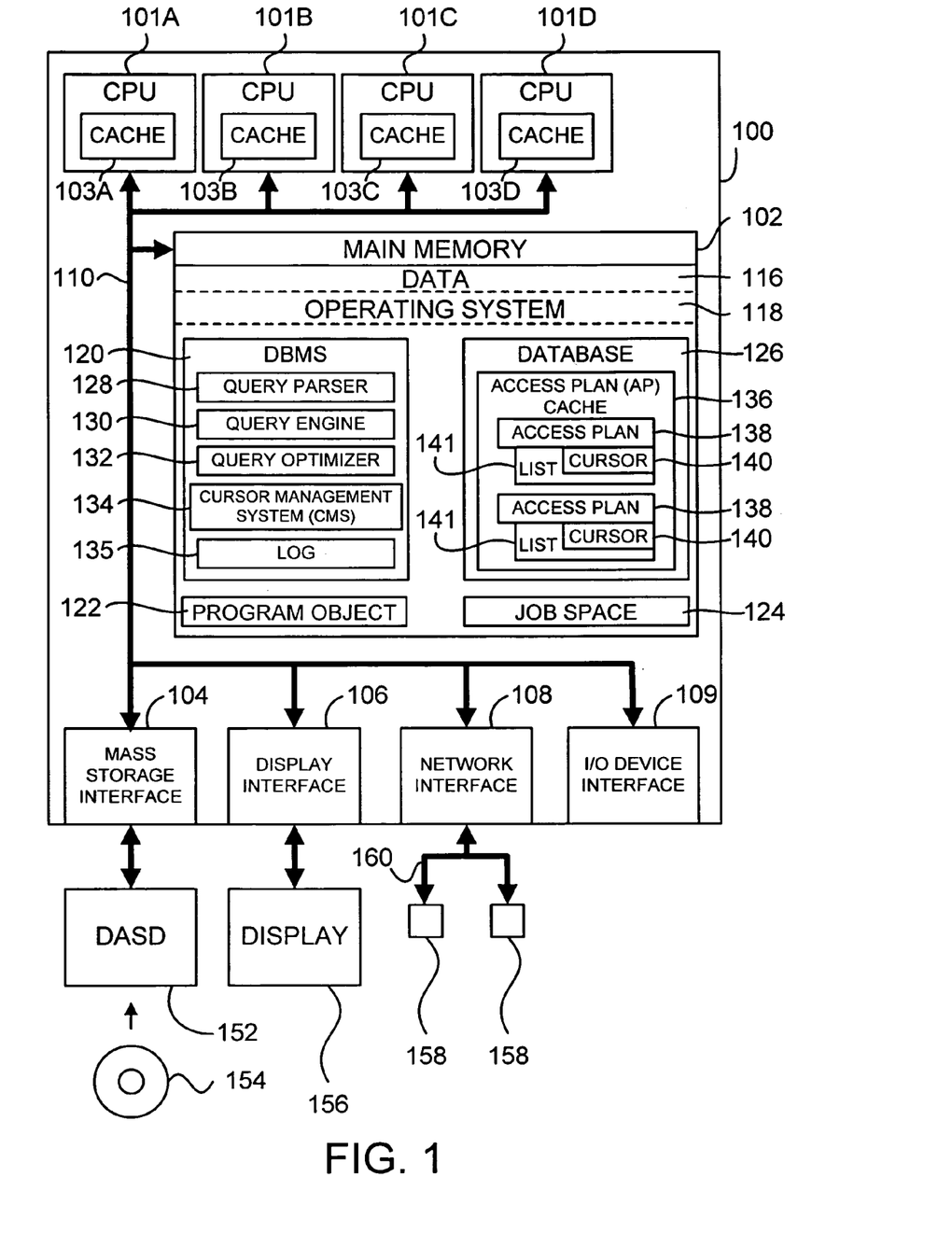
FIG. 1 is a block diagram of a computer apparatus for intelligent open query management in accordance with the preferred embodiments of the present invention.

A computer system implementation of the preferred embodiments of the present invention will now be described with reference to FIG. 1 in the context of a particular computer system 100, i.e., an IBM eServer iSeries or System i computer system. However, those skilled in the art will appreciate that the method, apparatus, and computer program product of the present invention apply equally to any computer system, regardless of whether the computer system is a complicated multi-user computing apparatus, a single user workstation, a PC, or an embedded control system. As shown in FIG. 1, computer system 100 comprises a one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, main memory 102 includes a database management system (DBMS) 120, a program object 122, a job space 124, and a database 126, all of which may in various embodiments exist in any number. Although the DBMS 120, the program object 122, the job space 124, and the database 126 are all illustrated as being contained within the main memory 102, in other embodiments some or all of them may be on different electronic devices (e.g., the database 126 may be on direct access storage device 152) and may be accessed remotely (e.g., via the network 160). Also, although an access plan (AP) cache 136 is illustrated as being contained within the database 126, in other embodiments the AP cache 136 may be at least partially located elsewhere (e.g., the AP cache 136 may be in the DBMS 120).

The exemplary DBMS 120 includes a query parser 128, a query engine 130, a query optimizer 132, a cursor management system (CMS) 134, and a log 135. The query parser 128 is preferably implemented as computer program instructions that parse a structured query language (SQL) query. An SQL query is presented to the DBMS 120 in text form, the parameters of the SQL command. The query parser 128 retrieves the elements of the SQL query from the text form of the query and places them in a data structure more useful for data processing of an SQL query by the DBMS 120.

The query engine 130 performs a query against the database 126 using a query access plan that the query optimizer 132 creates. When the DBMS 120 receives a query, the DBMS 120 interprets the query and the query optimizer 132 determines what internal steps are necessary to satisfy the query. These internal steps may include identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are typically referred to as a "query access plan" or "access plan" (AP), although they are sometimes referred to as an "execution plan".

As mentioned above, the query optimizer 132 create the query access plan. The query optimizer 132 is preferably implemented as computer program instructions that optimize the access plan in dependence upon database management statistics. Database statistics may reveal, for example, that there are only two storeID values in the transactions table—so that it is an optimization, that is, more efficient, to scan the transactions table rather than using an index. Alternatively, database statistics may reveal that there are many transaction records with only a few transaction records for each storeID—so that it is an optimization, that is, more efficient, to access the transaction records by an index.

In addition, the query optimizer 132 builds a query cursor from the query access plan. Query cursors are associated with multirow queries. Query cursors also can be associated with single row queries. A multirow query is a query that returns more than one row and its execution is handled in two stages. First, the program starts the query, although no data is returned immediately. Then, the program requests the rows of data one at a time.

These operations are performed using a special data object called a "cursor". A cursor is an executable data structure that represents the state of a query, either single row or multirow, and is built from a query access plan. The following list shows the general sequence of program operations:

1. The program declares the cursor and its associated SELECT statement, which merely allocates storage to hold the cursor.
2. The program opens the cursor, which starts the execution of the associated SELECT statement and detects any errors in it.
3. The program fetches a row of data into host variables and processes it.
4. The program closes the cursor after the last row is fetched.
5. When the cursor is no longer needed, the program frees the cursor to deallocate the resources it uses.

These operations may, for example, be performed with SQL statements named DECLARE, OPEN, FETCH, CLOSE, and FREE. Thus, an open query cursor, which is sometimes referred to as an open data path (ODP), is the object built by the query optimizer 132 when a user or application program issues an SQL OPEN statement, and is the live object which returns rows when a user or application program issues an SQL FETCH statement. Although SQL is a common interface, other interfaces such as QUERY (IBM iSeries), DDL, XML, etc. may be used to perform the requisite operations.

In accordance with the preferred embodiments of the present invention, the CMS 134 provides intelligent management to open query cursors built by the query optimizer 132 as further described below with reference to FIGS. 2, 3 and 4. For example, the CMS 134 detects whether the open query cursor was previously requested for use within another job. If the open query cursor was previously requested, the CMS 134 intelligently manages the query cursor for subsequent use within a different job. For example, the open query cursor may be recycled by the CMS 134 for subsequent use within the different job. Hence, system resources are not wasted in building and destroying the same cursors for multiple jobs. Alternatively, the CMS 134 may cause the query cursor to be pre-built by the query optimizer 132 before the cursor is requested for subsequent use within the different job.

The CMS 134 detects whether the open query cursor was previously requested for use within another job in accordance with the preferred embodiments of the present invention by keeping a log 135 of recent requests and/or the most populous requests. Although FIG. 1 illustrates the log 135 as being included in the DBMS 120, the log 135 may be kept elsewhere, such as in the query access plan.

In accordance with the preferred embodiments of the present invention, another important function of the CMS 134 is lock management. In this regard, the CMS 134 may obtain, release and re-obtain locks for the open query cursors it is managing on various tables that the query is examining. Alternatively, the job that uses the cursor may obtain the lock, although the CMS 134 would still manage the cursor's recycling and/or pre-building.

In the preferred embodiments of the present invention, the CMS 134, along with the query optimizer 132, include instructions capable of executing on the processors 101 or statements capable of being interpreted by instructions executing on the processors 101 to perform the functions as further described below with reference to FIGS. 2, 3 and 4. In another embodiment, the query optimizer 132 and/or the CMS 134 may be implemented in hardware via logic gates and/or other appropriate hardware techniques in lieu of, or in addition to, a processor-based system.

When the query optimizer 132 creates an access plan for a given query, the access plan is saved by the database management system 120, often in an access plan cache 136 of the database 126. The access plan may also be saved in an SQL (Structured Query Language) package (not shown) or in the program object 122, e.g., the application program that requested the query. Then, when the user or the program object 122 repeats the query, the database can reutilize the saved access plan instead of undergoing the time-consuming process of recreating it. Query access plan reuse is well known in the art. See, for example, U.S. Pat. No. 7,133,861 B2, entitled "QUERY ACCESS PLAN REUSE", issued on Nov. 7, 2006 to Day et al., and assigned to IBM Corporation, which discloses a method, apparatus and system that determines when to rebuild a query access plan and which is hereby incorporated herein by reference.

The program object 122, as mentioned above, represents an application program that requested the query. The program object 122 may be executed in the job space 124. The job space 124 may include one or more jobs, including jobs requesting the same access plan and/or the same cursor that was previously requested by another job. Alternatively, these jobs may exist elsewhere, e.g., within more than one job space.

As discussed above, the database 126 may include an access plan cache 136 having a saved access plan 138. The saved access plan 138 is created by the query optimizer 132 in a conventional manner. In accordance with the preferred embodiments of the present invention, one or more saved cursors 140 are associated with the saved access plan 138. For example, pre-built or recycled cursors may be kept in a list 141 hanging off their respective access plans. Thus, an incoming query from a job will find its access plan, then the incoming query will see that it already has one or more recycled cursors hanging off of its access plan and grab the one or more recycled cursors (versus building its own cursors). The cursor is built by the query optimizer 132 from the access plan and the open query cursor is saved by the CMS 134 preferably in access plan cache 136. Alternatively, the open query cursor may be saved in other locations, such as in an SQL package or in the program object 122, the application program that requested the query. The CMS 134 intelligently manages open query cursors, such as saved cursor 140, as further described below with reference to FIGS. 2, 3 and 4.

While the CMS 134 is shown separate and discrete from query optimizer 132 in FIG. 1, the preferred embodiments expressly extend to the CMS 134 being implemented within the query optimizer 132. In addition, the CMS 134 may be implemented in the operating system 118 or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, DBMS 120, program object 122, job space 124, and database 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the present invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 154 of FIG. 1), and transmission type media such as digital and analog communications links (e.g., network 160 in FIG. 1).

Figure 2:
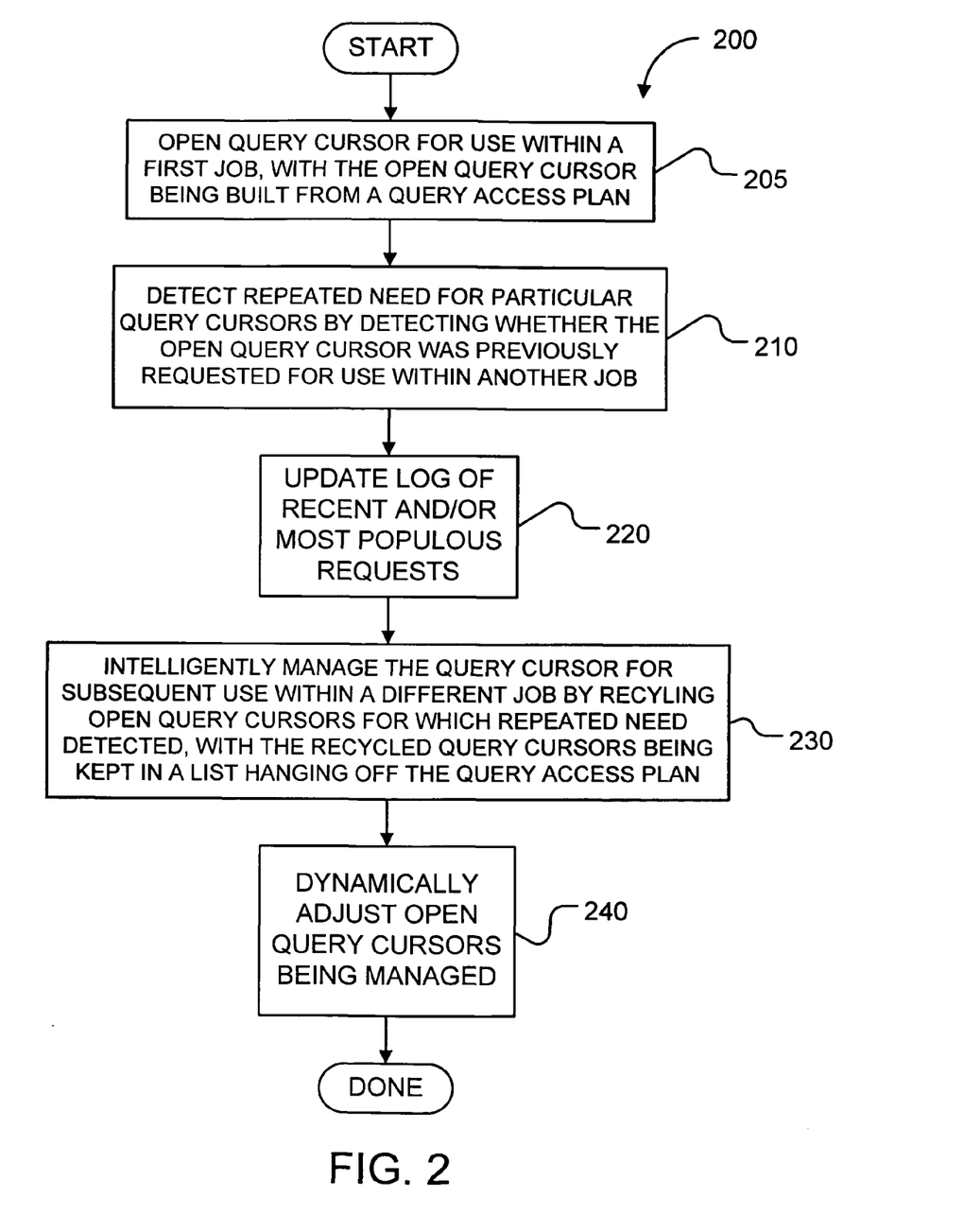
FIG. 2 is a flow diagram illustrating a method for intelligent open query cursor management by recycling query cursors in accordance with the preferred embodiments of the present invention.

FIG. 2 is a flow diagram illustrating a method 200 for intelligent open query cursor management by recycling query cursors in accordance with the preferred embodiments of the present invention. The method 200 begins with the opening of a query cursor for use within a first job (step 205) and the CMS detecting the repeated need for particular query cursors (step 210). In step 205, the open query cursor is built from a query access plan. Step 210 may, for example, include detecting whether an open query cursor, which was opened for use within a first job, was previously requested for use within another job. In accordance with the preferred embodiments of the present invention, the CMS checks a log of recent or most populous requests to see if the open query cursor was requested for use within another job. The repeated need for a particular query cursor may, for example, be determined by whether the log indicates that the open query cursor has been requested at a predetermined threshold level (e.g., requested at least a predetermined number of times within a predetermined period of time and/or requested at least at a predetermined percentile with respect to a total sample of requests, such as within the top decile, quintile, or quartile).

The method 200 continues with the CMS updating the log to include an entry corresponding to the open query cursor (step 220).

The method 200 continues with the CMS recycling the query cursors for which a repeated need was detected in step 210 (step 230), i.e., intelligently managing the open query cursor for subsequent use within a different job by recycling. In step 230, the CMS may save an open query cursor, which was opened for use within a first job, for subsequent use within a different job. In accordance with the preferred embodiments of the present invention, the recycled query cursors are saved in a list hanging off their respective access plans. Thus, an incoming query from a job will find its access plan, then the incoming query will see that it already has one or more recycled cursors hanging off of its access plan and grab the one or more recycled cursors (versus building its own cursors).

In accordance with the preferred embodiments of the present invention, the method 200 continues with the CMS dynamically adjusting the open query cursors that it is managing (step 240). Preferably, the CMS is able to intelligently adjust the number and/or identity of the particular cursors being managed based on patterns in demand for various queries. For example, one week query A might be the most popular among users, whereas a different week query B may be the most popular. The CMS preferably adjusts to the demand of the users for given queries. Step 240 may, for example, include periodically rechecking the log of recent and/or most popular requests to see if the saved query cursors continue to be requested at a predetermined threshold level.

Figure 3:
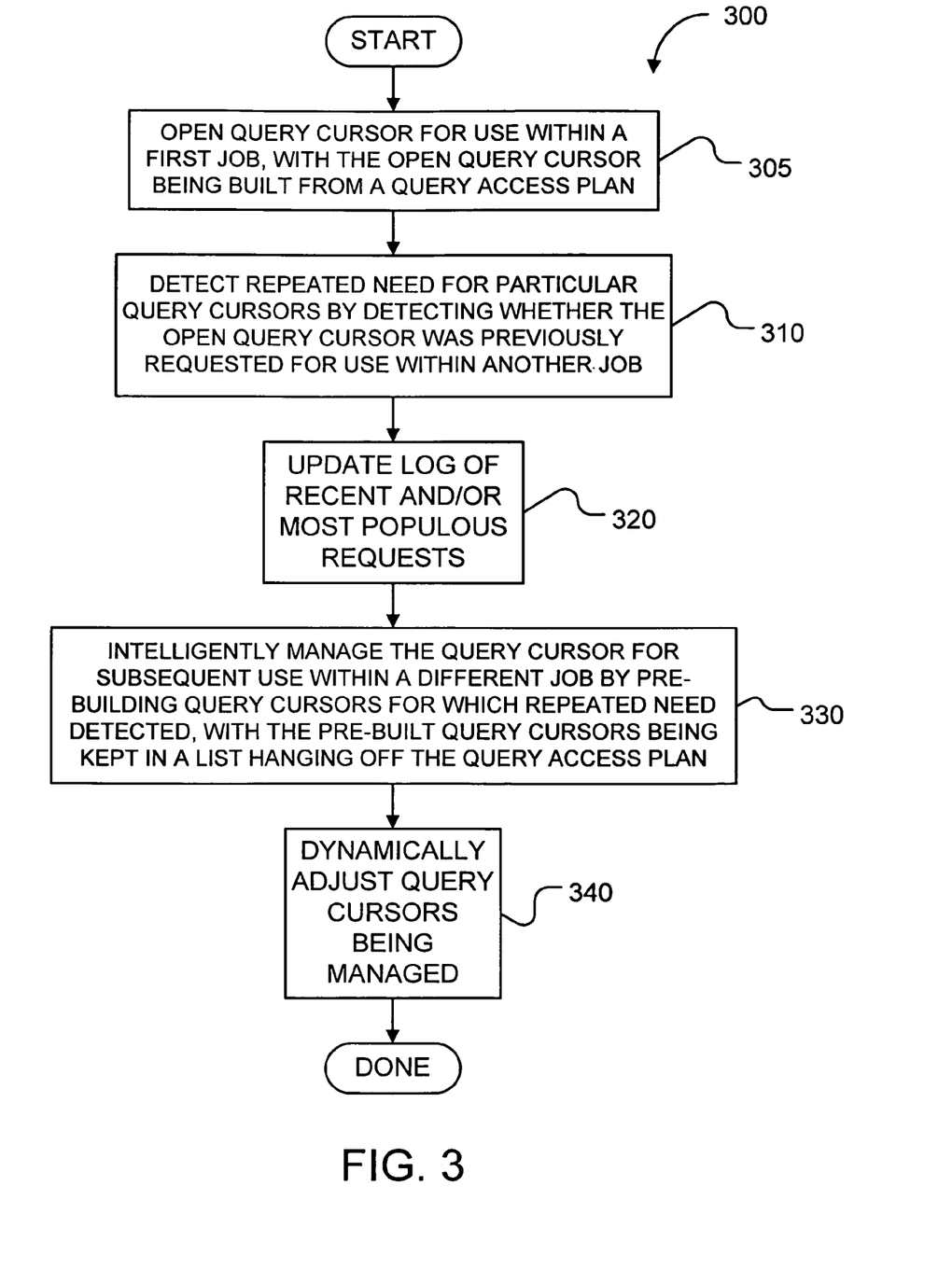
FIG. 3 is a flow diagram illustrating a method for intelligent open query cursor management by pre-building query cursors in accordance with the preferred embodiments of the present invention.

FIG. 3 is a flow diagram illustrating a method 300 for intelligent open query cursor management by pre-building query cursors in accordance with the preferred embodiments of the present invention. The method 300 begins with the opening of a query cursor for use within a first job (step 305) and the CMS detecting the repeated need for particular query cursors (step 310). In step 305, the open query cursor is built from a query access plan. Step 310 may, for example, include detecting whether an open query cursor, which was opened for use within a first job, was previously requested for use within another job. In accordance with the preferred embodiments of the present invention, the CMS checks a log of recent or most populous requests to see if the open query cursor was requested for use within another job. The repeated need for a particular query cursor may, for example, be determined by whether the log indicates that the open query cursor has been requested at a predetermined threshold level (e.g., requested at least a predetermined number of times within a predetermined period of time and/or requested at least at a predetermined percentile with respect to a total sample of requests, such as within the top decile, quintile, or quartile).

The method 300 continues with the CMS updating the log to include an entry corresponding to the open query cursor (step 320).

The method 300 continues with the CMS pre-building the query cursors for which a repeated need was detected in step 310 (step 330), i.e., intelligently managing the open query cursor for subsequent use within a different job by pre-building. Step 330 may, for example, include checking the log of recent and/or most popular requests for patterns in demand for various queries and predicting a time when a particular query cursor will be requested again. In step 330, the CMS may, for example, cause the query optimizer to pre-build query cursors ahead of the predicted time and save the pre-built cursors in a list hanging off their respective access plans. Thus, an incoming query from a job will find its access plan, then the incoming query will see that it already has one or more pre-built cursors hanging off of its access plan and grab the one or more pre-built cursors (versus building its own cursors).

In accordance with the preferred embodiments of the present invention, the method 300 continues with the CMS dynamically adjusting the query cursors that it is managing (step 340). Preferably, the CMS is able to intelligently adjust the number and/or identity of the particular cursors being managed based on patterns in demand for various queries. For example, one week query A might be the most popular among users, whereas a different week query B may be the most popular. The CMS preferably adjusts to the demand of the users for given queries. Step 340 may, for example, include periodically rechecking the log of recent and/or most popular requests to see if the query cursors designated for pre-building continue to be requested at a predetermined threshold level.

In the first illustrative problem scenario set forth above in the Background section, one thousand users at a typical call center logon their computer system at 8:00 am. They all run an application with twenty-five common queries. Therefore, at 8:00 am, a conventional computer system must perform "full opens" on twenty-five thousand queries (i.e., 1000×25 queries). At a CPU cost of about ½ second per a full open, a considerable CPU cost spike of 208 CPU minutes occurs in the conventional computer system at 8:00 am. A similar CPU cost spike may be felt in the conventional computer system at other times during the day, such as after lunch when all of the users again logon their computer system. In accordance with the preferred embodiments of the present invention, the CMS pre-builds or recycles cursors to address this CPU cost spike problem. For example, the CMS may begin early in the morning creating twenty-five thousand open cursors that the CMS knows will be needed by 8:00 am. Alternatively, the CMS may cause the cursors not to be deleted as they normally would when the users signoff, but instead holds the cursors for use the next morning when the users arrive again.

The second illustrative problem scenario occurs in the context of an online web retail application. Multiple users throughout the day run a handful of the same queries, such as lookup product X. In a conventional computer system, each of the users must pay a full open hit when they sign on, as the cursors are built, when the query is run, when the query is closed, and when the ODP is destroyed. No users benefit from the similar full opens of other users that occurred previously. Consequently, in a conventional computer system, CPU time is wasted by building the same query cursor over and over for different users. In accordance with the preferred embodiments of the present invention, the CMS pre-builds or recycles cursors to address this problem. For example, the CMS may keep the open cursors from a first user who has signed off and pass them to a second user signing on. Alternatively, the CMS may track how many open cursors of each particular query it needs on an average day. In this alternative embodiment, the CMS then creates those cursors ahead of time and hands them out as needed.

In accordance with the preferred embodiments of the present invention, it may also be desirable to incorporate a lock management mechanism into the CMS to provide different levels of commit (i.e., isolation).

Figure 4:
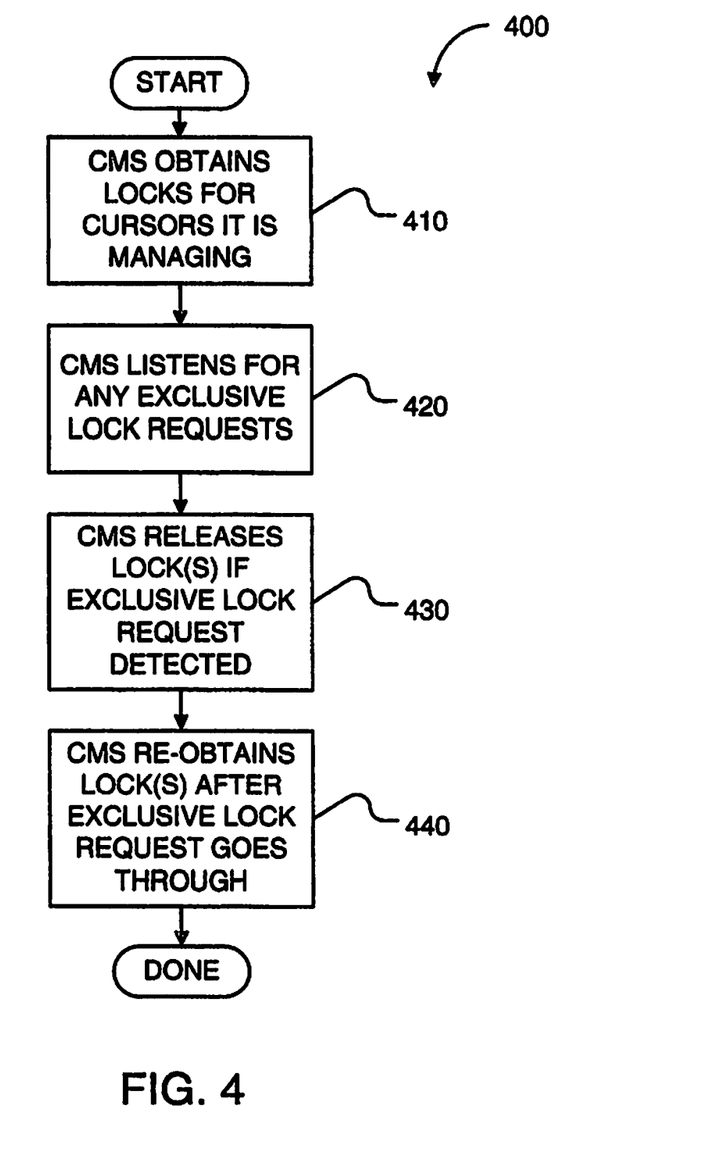
FIG. 4 is a flow diagram illustrating a method for intelligent open query cursor management that incorporates a lock management mechanism in accordance with the preferred embodiments of the present invention.

FIG. 4 is a flow diagram illustrating a method 400 for intelligent open query cursor management that incorporates a lock management mechanism in accordance with the preferred embodiments of the present invention. The method 400 begins with the CMS obtaining locks for the cursors it is managing on various tables that a query is looking at (step 410). The CMS must, however, be cognizant when it must release its locks for currently running jobs requesting exclusive locks, such as an update lock. As is well known in the art, such exclusive lock requests may be monitored by an open query cursor. Consequently, the method 400 continues with the CMS listening for any exclusive lock requests (step 420). If an exclusive lock request is detected in step 420, the method 400 continues with the CMS releasing its locks as appropriate for the cursor (step 430). Then, the method 400 continues with the CMS re-gathering the locks after the exclusive lock request goes through (step 440).

One of ordinary skill in the art will recognize that various modifications of the lock management mechanism are possible. For example, the CMS may monitor how aggressively to set up various locks for its cursors depending on how much resource it must use to release and reacquire them. In most systems, even frequent obtaining, releasing, and re-obtaining of locks will be cheaper in terms of resource use than performing the extra full opens.

In an alternative embodiment, the CMS will manage the building of the open cursors, but not obtain any locks. According to this alternative embodiment, the job that uses the cursor will be required to obtain the lock in a conventional manner, but the work of building the cursor will be managed by the CMS.

One skilled in the art will appreciate that many variations are possible within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method for intelligent open query cursor management, comprising the steps of:
    opening a query cursor for use within a first job;
    detecting whether the open query cursor was previously requested for use within another job, wherein the step of detecting whether the open query cursor was previously requested for use within another job includes the steps of:
        keeping a log of at least one of recent requests and/or most populous requests;
        determining whether the log indicates that the open query cursor has been requested at a predetermined threshold level; and
        updating the log to include an entry corresponding to the open query cursor; and
    if the open query cursor was previously requested for use within another job, intelligently managing the query cursor for subsequent use within a different job, wherein the step of intelligently managing the query cursor for subsequent use within a different job includes either the step of recycling the open query cursor for subsequent use within the different job or the step of pre-building the query cursor before it is requested for subsequent use within the different job, and wherein the step of intelligently managing the query cursor for subsequent use within a different job further includes the step of periodically rechecking the log to see if the saved query cursor or the pre-built query cursor continues to be requested at the predetermined threshold level,
    wherein the step of determining whether the log indicates that the open query cursor has been requested at a predetermined threshold level includes the step of determining if the open query cursor was requested at least a predetermined number of times within a predetermined period of time and/or the open query cursor was requested at least a predetermined percentile with respect to a total sample of requests.

2. A data processing system, comprising:
    a processor;
    a memory coupled via a bus to the processor, the memory encoded with instructions that when executed by the processor comprise the steps of:
        opening a query cursor for use within a first job;
        detecting whether the open query cursor was previously requested for use within another job, wherein the step of detecting whether the open query cursor was previously requested for use within another job includes the steps of:
            keeping a log of at least one of recent requests and/or most populous requests;
            determining whether the log indicates that the open query cursor has been requested at a predetermined threshold level; and
            updating the log to include an entry corresponding to the open query cursor; and
        if the open query cursor was previously requested for use within another job, intelligently managing the query cursor for subsequent use within a different job, wherein the step of intelligently managing the query cursor for subsequent use within a different job includes either the step of recycling the open query cursor for subsequent use within the different job or the step of pre-building the query cursor before it is requested for subsequent use within the different job, and wherein the step of intelligently managing the query cursor for subsequent use within a different job further includes the step of periodically rechecking the log to see if the saved query cursor or the pre-built query cursor continues to be requested at the predetermined threshold level,
    wherein the step of determining whether the log indicates that the open query cursor has been requested at a predetermined threshold level includes the step of determining if the open query cursor was requested at least a predetermined number of times within a predetermined period of time and/or the open query cursor was requested at least a predetermined percentile with respect to a total sample of requests.

3. A computer program product for implementing intelligent open query cursor management in a digital computing device having at least one processor, comprising:

a plurality of executable instructions provided on computer readable recordable media, wherein the executable instructions, when executed by the at least one processor, cause the digital computing device to perform the steps of:

opening a query cursor for use within a first job, detecting whether the open query cursor was previously requested for use within another job, wherein the step of detecting whether the open query cursor was previously requested for use within another job includes the steps of:

keeping a log of at least one of recent requests and/or most populous requests;

determining whether the log indicates that the open query cursor has been requested at a predetermined threshold level; and updating the log to include an entry corresponding to the open query cursor; and if the open query cursor was previously requested for use within another job, intelligently managing the query cursor for subsequent use within a different job, wherein the step of intelligently managing the query cursor for subsequent use within a different job includes either the step of recycling the open query cursor for subsequent use within the different job or the step of pre-building the query cursor before it is requested for subsequent use within the different job, and wherein the step of intelligently managing the query cursor for subsequent use within a different job further includes the step of periodically rechecking the log to see if the saved query cursor or the pre-built query cursor continues to be requested at the predetermined threshold level, wherein the step of determining whether the log indicates that the open query cursor has been requested at a predetermined threshold level includes the step of determining if the open query cursor was requested at least a predetermined number of times within a predetermined period of time and/or the open query cursor was requested at least a predetermined percentile with respect to a total sample of requests.

* * * * *